(12) United States Patent
Colbaugh et al.

(10) Patent No.: US 10,150,341 B2
(45) Date of Patent: Dec. 11, 2018

(54) HITCH HAVING MEANS FOR SECURING A PTO DURING TRANSIT

(71) Applicants: Randy Colbaugh, Bluff City, TN (US); Bill Gentry, Elizabethton, TN (US)

(72) Inventors: Randy Colbaugh, Bluff City, TN (US); Bill Gentry, Elizabethton, TN (US)

( * ) Notice: Subject to any disclaimer, the term of this patent is extended or adjusted under 35 U.S.C. 154(b) by 65 days.

(21) Appl. No.: 15/530,912

(22) Filed: Mar. 21, 2017

(65) Prior Publication Data

US 2018/0272817 A1     Sep. 27, 2018

(51) Int. Cl.
| | |
|---|---|
| *B60D 1/24* | (2006.01) |
| *A01B 59/00* | (2006.01) |
| *A01B 73/00* | (2006.01) |
| *B60D 1/02* | (2006.01) |
| *A01B 59/042* | (2006.01) |
| *B60D 1/00* | (2006.01) |

(52) U.S. Cl.
CPC .............. *B60D 1/24* (2013.01); *A01B 59/002* (2013.01); *A01B 73/00* (2013.01); *B60D 1/02* (2013.01); *A01B 59/042* (2013.01); *B60D 2001/001* (2013.01); *B60D 2001/008* (2013.01)

(58) Field of Classification Search
CPC .......... B60D 1/00; B60D 1/145; B60D 1/167; B60D 1/24; A01B 59/002
See application file for complete search history.

(56) References Cited

U.S. PATENT DOCUMENTS

| | | | |
|---|---|---|---|
| 3,557,892 A | 1/1971 | Burrough | |
| 4,184,558 A | 1/1980 | De Buhr et al. | |
| 4,266,799 A * | 5/1981 | Wood ........................ | B60D 1/06 |
| | | | 280/482 |
| 4,366,877 A | 1/1983 | Vissers et al. | |
| 5,152,357 A | 10/1992 | McLean et al. | |
| 5,702,118 A * | 12/1997 | Hanson ...................... | B60D 1/07 |
| | | | 280/416.1 |
| 5,706,901 A | 1/1998 | Walters et al. | |
| 6,119,789 A | 9/2000 | Taylor | |
| 6,238,170 B1 | 5/2001 | Pingry et al. | |
| 6,412,570 B1 | 7/2002 | Pruitt et al. | |
| 6,837,510 B1 * | 1/2005 | Karls ........................ | B60D 1/07 |
| | | | 280/416.1 |
| 7,255,362 B2 * | 8/2007 | Smith ........................ | B60D 1/46 |
| | | | 280/462 |
| 7,278,502 B2 | 10/2007 | Trefz et al. | |
| 7,575,077 B2 | 8/2009 | Priepke et al. | |
| D618,142 S * | 6/2010 | Hancock ...................... | D12/162 |

(Continued)

*Primary Examiner* — Matthew D. Troutman
(74) *Attorney, Agent, or Firm* — Mark L. Davis (57) ABSTRACT

A hitch comprising: a) a first member having a first top surface, an opposing first bottom surface, a first side, an opposing second side, a first end, a distal second end, and at least one channel proximate the first end and extending from the first side through to the second side. A second channel proximate the second end and extending from first top surface to the bottom surface; and b) a second member next to the second end and having a predetermined thickness, the second member having a third end, a fourth end, and a third channel next to the fourth end. The third channel extends through the predetermined thickness. A portion of the second member is rigidly affixed to a portion of the first member, so that the second bottom surface and the first top surface are at an acute angle Ø.

28 Claims, 3 Drawing Sheets

(56) References Cited

U.S. PATENT DOCUMENTS

| | | | | |
|---|---|---|---|---|
| 8,276,932 B2* | 10/2012 | Columbia | ................ | B60D 1/06 280/495 |
| 8,312,947 B2 | 11/2012 | Goulet et al. | | |
| 8,371,603 B2* | 2/2013 | Columbia | ................ | B60D 1/06 280/504 |
| 8,840,130 B2* | 9/2014 | Columbia | ................ | B60D 1/06 280/504 |
| 2008/0157504 A1* | 7/2008 | Schuettenberg | ......... | B60D 1/00 280/402 |
| 2013/0264367 A1* | 10/2013 | Hill | ........................... | B60R 9/06 224/413 |
| 2016/0046160 A1* | 2/2016 | Schwarz | ................ | B60D 1/42 280/446.1 |

* cited by examiner

HITCH HAVING MEANS FOR SECURING A PTO DURING TRANSIT

FIELD OF THE INVENTION

The present invention is directed to a vehicular hitch and more particularly, to a vehicular hitch having a means for securing and supporting an end of a power takeoff (PTO) drive shaft when the implement is being towed utilizing the vehicular hitch.

BACKGROUND OF THE INVENTION

Typically, agricultural machines and implements are towed by a tractor. As is also typical of agricultural implements, the implements are generally powered from the tractor utilizing the tractor's power takeoff output shaft, i.e., a spline in the rear of the tractor, driven by a driving means such as a mechanical connection to the tractor's transmission or powered by the tractor's hydraulic pump. The transfer of power from the tractor's PTO spline, to the driven means, i.e., the agricultural implement is accomplished by means of a PTO drive shaft. Typically, the driving spline on the tractor includes a small, circumferential detent positioned from about 1 to about 2 inches from the exposed end. This detent allows the drive shaft to be removably captured on the spline, as detailed below.

The PTO drive shaft typically includes: a main front portion adapted to be connected to the tractor PTO output shaft; a rear or aft portion that is connected to a corresponding driving spline or shaft of the implement; and a middle portion that typically is telescopically adjustable so the length of the drive shaft can be adjusted over a predetermined distance or range to facilitate connecting or disconnecting the PTO drive shaft to/from tractor as well as allowing the drive shaft to adjust during use, as when the distance between the tractor and the implement is varied over terrain or during turns and the like.

The PTO drive shaft is connected to the tractor PTO output shaft utilizing a PTO hookup assembly. The PTO hookup assembly may have a single universal joint (U-joint) having a portion of the U-joint captured between a first yoke being rigidly affixed to the drive shaft and a another portion captured between a second, forward (toward the tractor) yoke. The second yoke conventionally includes an internally splined member that slips over and is mateable with the externally splined tractor PTO output shaft.

The second yoke includes a means for capturing the spline so that it will not slip off. Such capturing means can be a spring-assisted collar that circumferentially encircles the outer portion of the second yoke, proximate the end closest to the tractor. To mate the second yoke to the tractor's driving spline, the collar is pulled rearward, toward the implement, and the yoke slipped over the spline. When properly seated, the collar moves forward over the circumferential detent of the spline to a home position preventing the yoke from receding or pulling free from the spline. Alternatively, the capturing means can be a spring loaded button or pin that must be pushed inward to mate the second yoke to the tractor's driving spline. When properly seated the button or pin moves forward over the circumferential detent of the spline to its home position preventing the yoke from receding or pulling free from the spline. Both of these capturing means are well known in the art.

Alternatively, the drive shaft may include a plurality of universal joints adjacent the forward and rearward ends, respectively, of the hookup assembly to form a constant velocity (CV) joint. The CV joint accommodates pivoting movement between the tractor and the towed implement that may occur during use. In the drive shaft extending rearwardly from the PTO, a constant velocity (CV) joint conventionally is attached to the PTO shaft at the back of the tractor, and the drive shaft extends rearwardly from the CV joint to connect with the driven shaft on the farm equipment. The CV joint maintains a constant instantaneous rotational velocity of the drive shaft, throughout each complete revolution of the PTO shaft, whether or not the tractor is turning relative to the towed equipment.

Over the years, implements and agricultural equipment for tillage, cultivation and other agricultural operations have been developed with the objectives of increasing efficiency and lowering operating costs. Modern agricultural operations commonly require equipment be adapted for transporting over public roads. For example, many farmers and farming operations work multiple, noncontiguous fields with the same equipment, which must be configured to comply with traffic regulations, including maximum width requirements. Various implement transport mechanisms have been developed for this purpose. For example, implements are commonly designed to fold and unfold between field use and transport configurations.

It is important to be able to move these heavy agricultural implements from one location to another and to quickly connect and disconnect the equipment. One method of transport employs the use of a trailer having a lift mechanism as described in U.S. Pat. No. 6,238,170, which describes an implement transporter including a trailer having a lifting and rotating mechanism for engaging, lifting and rotating the implement. The trailer includes a turntable supporting a cantilevered arm and the cantilevered arm includes a lift and support assembly. However, such methods are time consuming and require the added expense of obtaining a trailer as well as an appropriate vehicle for pulling the trailer.

A great number of mechanical agricultural implements typically connect to transportation devices, such as a half or one ton truck using a hitch, such as Cat. II or Cat. III two-point hitch, or utilize a removable drawbar type hitch. There are several classes or variations of the trailer hitch receiver, most hitch receivers are bolted to the chassis of the towing vehicle. The receiver recess or opening varies in size and configuration to meet the tongue load and other weight limitations. For example, one of the more common constructions is a Cat. III hitch receiver. The receiver has a 2-inch by 2-inch inside dimension (ID) opening that is designed to removably mate with the hitch member having a slightly smaller outside dimension. Many trucks and sport utility vehicles are fitted with such a Class III or IV trailer hitch. The Class of this type of hitch receiver is generally indicative of the weight capacity of the hitch and the receiver size. There are several additional classes, such as Class I or Class V, trailer hitches available, depending on the application and desired weight carrying capacity. The receiver has two coaxially aligned holes or apertures on the sides that are used to align with a corresponding channel in the hitch so a retaining pin can be inserted to capture the hitch when properly inserted into the hitch receiver recess.

As known in the art, a hitch includes a hole on one end for mounting a means for connecting the towed device to the towing vehicle. Examples would be a trailer ball having an appropriate diameter or using a hitch pin through an implement yoke and the hole. Such mounting means permits the towed device to be pivotally secured to the hitch. In the case of a ball mount, it also comes in multiple dimensions to make it adaptable which is known in the art.

A problem with the present arrangement is that the PTO drive shaft is normally not supported except by its connections to the rear universal joint on the implement driven spline and to the tractor's driving spline. When the implement PTO drive shaft is separated from the tractor for transport, whether over ground or on the road, the forward end of the hookup assembly is free to dangle. Since the PTO drive shaft is typically telescopic, the free end has the potential to be exposed to the mud as well as damage if the hookup assembly end drops off or slips forward sufficiently to contact the ground or a paved surface.

Up to now, the PTO drive shaft was either tied to a portion of the implement for transport or was removed altogether. This is a problem for larger agricultural implements, such as hay bailers, hay tedders, sprayers, spreaders, seed drills, and large rotary cutters, since the PTO drive shafts are typically long, heavy and cumbersome if removed from the implement. In such cases the PTO drive shaft must be secured separately to prevent loss. Moreover, if the PTO drive shaft is retained on the implement and the free end slips forward of otherwise breaks free the forward end could be damaged due to contact with the ground, and/or the implement may be damaged as well as pose a road hazard if it is dropped on the road. Additionally, many of these PTO drive shafts are quite expense if needed to be replaced.

Accordingly, there is a need for a device that would allow an implement that utilizes a PTO drive shaft for power to have a portion, and desirably, the driving portion of the PTO drive shaft removably attached during transport to a hitch on a transporting vehicle. It would further be advantageous for the connection to allow the PTO drive shaft to rotate if necessary.

SUMMARY OF THE INVENTION

Briefly, the present invention is an improved vehicular hitch that includes a member having a means for supporting the forward end, i.e., that portion that is connected to the tractor's driving spline, of an agricultural implement PTO drive shaft when the implement is disconnected from a tractor and is connected to the hitch for transport.

In accordance with the invention, in one embodiment the vehicular hitch includes a first member that is adapted for engaging a hitch receiver having a predetermined recess dimension. The first member has a first top surface, an opposing first bottom surface, a first side, an opposing second side, a first end, a distal second end, and at least one channel proximate the first end and extending from the first side through to the second side. The at least one channel is sized so that a hitch retaining pin can be used to engage with the hitch receiver and the hitch when the hitch is properly positioned in hitch receiver. The first member further includes a second channel proximate or next to the second end. This second channel extends from the first top surface through to the first bottom surface and is configured to accept a hitch ball or hitch pin.

The hitch of the present invention further includes a second member having a portion thereof rigidly affixed to at least a portion of the first member. The second member has a predetermined thickness defined by a second top surface and a second bottom surface. The second member has a third end, a fourth end, and a third channel positioned proximate to the fourth end. The third channel extends through the predetermined thickness and has a predetermined diameter D1. The second bottom surface and the first top surface are juxtaposed at a first acute angle Ø.

In another embodiment, the vehicular hitch includes a first member that is adapted for engaging a hitch receiver having a predetermined recess dimension. The first member has a first top surface, an opposing first bottom surface, a first side, an opposing second side, a first end, a distal second end, and at least one channel proximate first end and extending from the first side through the second side. The at least one channel is sized so that a hitch retaining pin can be used to engage with the hitch receiver and the hitch when the hitch is properly positioned in hitch receiver. The hitch further includes a third member having a predetermined thickness defined by a third top surface and a third bottom surface. Defined between a fifth end and a sixth end is a top section, a middle section and a bottom section of the third member. The third member has a first aperture positioned proximate the fifth end and a second aperture having a predetermined diameter D1 proximate the sixth end. A portion of the third bottom surface, desirably in the middle section, is affixed to the distal second end of the first member so that a portion of the third bottom surface of the top section and the first top surface are juxtaposed at a first acute angle Ø.

It is an object of the present invention to provide a hitch that can be utilized in a typical Cat. II, Cat. III, and Cat. IV hitch receiver without having to modify the receiver.

It is another object of the present invention to provide a hitch having a means for attaching the free end of an agricultural implement's PTO drive shaft when the implement is disconnected from a tractor and connected to a vehicle for transport.

These and other objects and advantages of the present invention will become more apparent to those skilled in the art in view of the following description and the accompanying drawings wherein like parts and objects in the several views have similar reference numerals. It is to be understood that the inventive concept is not to be considered limited to the constructions disclosed herein but instead by the scope of the appended claims.

DETAILED DESCRIPTION OF THE INVENTION

It is to be understood that the presently described hitch of the invention is capable of many equivalent forms. While the drawings illustrate two such variations, and the specification describes certain preferred embodiments of the invention, such figures and description are by way of example only. There is no intent to limit the principles and scope of the invention to the particularly described embodiments.

As used herein, any relational term, such as "first", "second", "third", "fourth", "top or upper", "bottom or lower", and the like, is used for clarity and convenience in understanding the disclosure and accompanying drawings, and does not connote or depend on any specific preference, orientation, or order, except where the context clearly indicates otherwise. For example, these terms may refer to an orientation of elements of the hitch relative to a surface on which the hitch may be positioned when mounted in a hitch receiver, (e.g., as illustrated in the figures).

As used herein, the terms "about" and "substantially" in reference to a given parameter, property, or condition means and includes to a degree that one skilled in the art would understand that the given parameter, property, or condition is met with a small degree of variance, such as within acceptable manufacturing tolerances. For example, a parameter that is "about" or "substantially" would be met with a variance up to 25%, or in another aspect up to 20% variance, or in another aspect up to 15% variance, or desirably in another aspect up to 10% variance and still be acceptable in the range, property or condition delineated herein.

Figure 1:
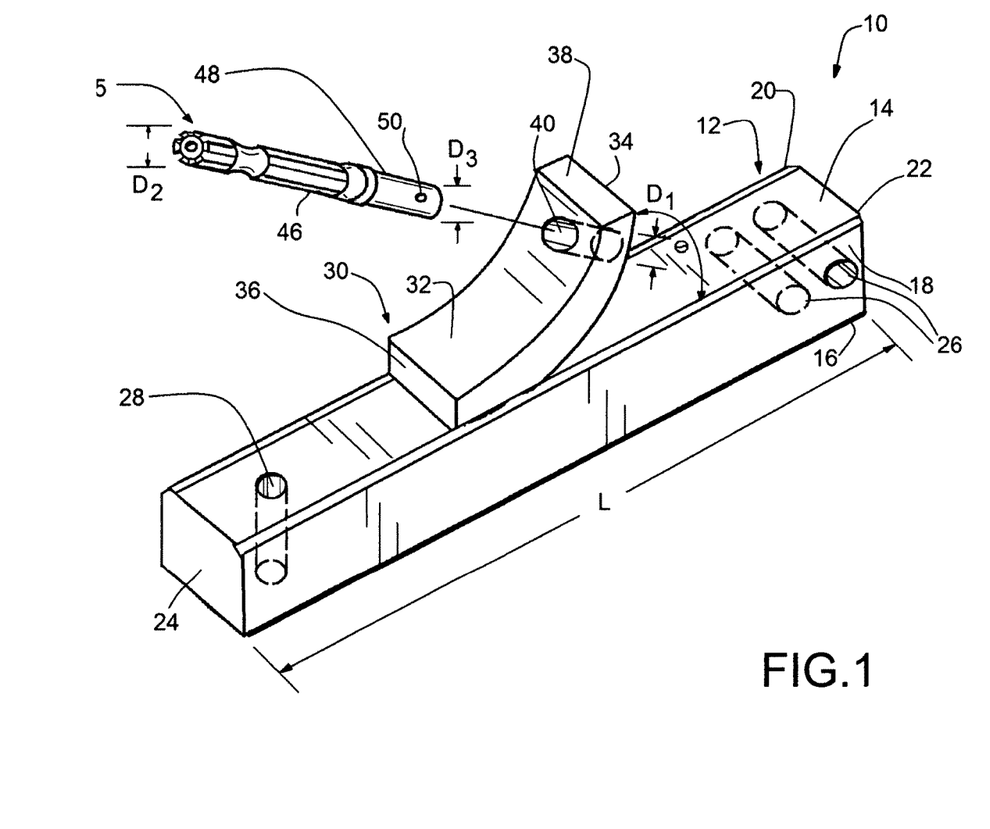
FIG. 1 is a perspective view of one embodiment of the novel hitch of the present invention.

Referring to FIG. 1, the novel hitch 10 comprises a first member 12 that is adapted for engaging a hitch receiver, (not shown) having a predetermined recess dimension. The first member 12 can be fabricated from solid bar stock or hollow tubular metal. Desirably, the first member 12 is fabricated from solid bar stock such as 2 inch square 1018 CRS metal and may have a chamfer, bevel or rounded edge on at least one corner to facilitate inserting into the hitch receiver recess. Preferably, the first member 12 has a chamfer, bevel or rounded edge on all four corners to facilitate inserting into the hitch receiver recess.

The first member 12 has a first top surface 14, an opposing first bottom surface 16, a first side 18, and an opposing second side 20. The first member 12 has a length, "L", defined as the distance from a first end 22 to a distal second end 24, of from about 4 to about 24 inches, or in another aspect of from 4 to 20 inches, or in yet another aspect of from about 6 to 16 inches. Proximate to the first end 22 is at least one channel 26 that extends from the first side 18 through the opposing second side 20. The at least one channel 26 is sized so that a hitch retaining pin can be used to engage with the hitch receiver recess and secure the hitch 10 in the receiver when the hitch 10 is properly positioned and the holes in the hitch receiver and at least one channel 26 are in alignment. Such method of securing a hitch in a hitch receiver recess is typical and well known. The first member 12 further includes a second channel 28 proximate to, or near the second end 24. This second channel 28 extends from the first top surface 14 through to the opposing first bottom surface 16 and configured to accept a hitch ball or hitch pin. The second channel 28 may be threaded for accepting a ball mount having a threaded bottom portion or may sized so that the threaded portion would pass through the second channel 28 unimpeded, in which case a separate fastener, such as a lock washer and nut, are utilized to secure the ball to the hitch 10.

The first member 12 cane have a predetermined outside dimensional configuration (ODC) that is suitable for engaging a Cat. II to Cat. V hitch receiver recess. Generally, the widths of the first top surface 14 and first bottom surface 16 are of equal dimension as are the first side 18 and the second side 20. In one aspect the first top surface 14, the first bottom surface 16, the first side 18 and the second side 20 have equal ODC. In another aspect, the first member 12 has a width or dimension of from about 2 inches×2 inches to about 3.5 inches×3.5 inches. In yet another aspect, the first member 12 has a width of from about 2 inches×2 inches to about 2.5 inches×2.5 inches. Although the ODC is described as having the top 14, bottom 16, first side 18 and second side 20 of equal dimension, one skilled in the art will understand that such a configuration may be adapted to fit a predetermined hitch receiver recess configuration wherein such recess does not have equal dimensions. Such adaptions are within the scope of the present invention.

The at least one channel 26 has an opening that is configured to allow a hitch retaining pin to engage with the hitch receiver and secure the hitch 10 when the hitch 10 is properly positioned in the hitch receiver, as is well known in the hitch art. Generally, the at least one channel 26 has a circular configuration for ease of fabrication, but may also be any geometric configuration that matches or allows the receiver retaining pin to secure the hitch 10 without excessive play. Although illustrated as having a single channel 26, one skilled in the art will understand that the first member 12 may have a plurality of such channels 26, (shown in phantom) to permit adjustability of the first member 12 within a hitch receiver recess. When the at least one channel 26 is circular, it may have a diameter of from about 0.25 of an inch to about 0.85 of an inch. In another aspect, the at least one channel 26 diameter is from about 0.25 to about 0.75 of an inch, or is from about 0.25 to about 0.625 of an inch, or in another aspect is from about 0.375 to about 0.5 of an inch.

Continuing reference to FIG. 1, the hitch 10 further includes a second member 30 having a portion thereof rigidly affixed to at least a portion of the first member 12. The second member 30 has a predetermined thickness defined by a second top surface 32 and a second bottom surface 34. The second member 30 has a third end 36, a fourth end 38, and a third channel 40 positioned proximate to the fourth end 38. The third channel 40 extends through the predetermined thickness and has a predetermined diameter D1. Desirably, the second member 30 has a non-linear configuration such that the third end 36 is affixed to at least a portion of first top surface 14 and the forth end 38 projects above the first top surface 14 a predetermined distance of from about 2 to about 10 inches, or from about 2 to about 8 inches or from about 2 to about 4 inches. The second bottom surface 34 is at a first acute angle Ø, as defined by the angle between a plane of the second bottom surface 34 and a plane of the first top surface 14. The first acute angle Ø can be from 10 degrees to about 80 degrees, or in another aspect of from 20 to about 65 degrees, or in yet another aspect of the invention of from 25 to about 45 degrees.

Methods for rigidly affixing the second member 30 to the first member 12 include, but are not limited to, bolting and welding. Desirably, the third end 36 is affixed to at least a portion of the first member 12 proximate to the distal second end 24, i.e., from about 2 to about 4 inches from the second channel 28. The second member 30 may be fabricated from any material that is suitable or compatible for rigidly affixing the second member 30 to the first member. In the case where the second member 30 is welded to the first member 12 any material may be used that would allow the two materials to be successfully welded, such as for example, when the first member 12 is fabricated from one of the aforementioned materials, the second member 30 may be fabricated from A-36 HRS or 1018 CRS metal.

One skilled in the art would understand that the hitch 10 may alternatively, be fabricated by machining the first and second members 12 and 30 from a single block of metal or produced using 3D printing as the technology progresses and still be within the scope of the present invention.

Figure 2:
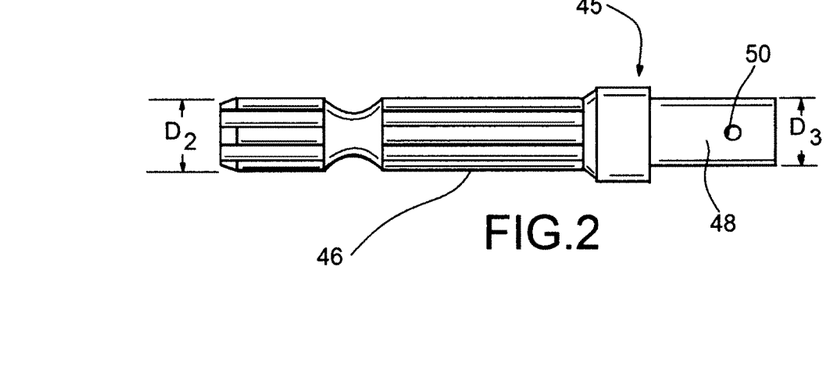
FIG. 2 is a side view of a PTO drive shaft yoke engaging means illustrated as a modified tractor drive spline that has one end being adapted for rotationally engaging the hitch and an opposing end useful for engaging the PTO drive shaft yoke.

Referring to FIG. 2 the third channel 40 is adapted to engage a means 45 for rotationally attaching a splined PTO drive shaft yoke to the hitch. In one aspect, the means for engaging the PTO yoke is a modified tractor drive spline comprising: a shaft 46 having a diameter D2 that is greater than diameter D1 and is adapted to receive the PTO drive shaft splined yoke; and a post 48 on one end of the shaft 46. Such PTO drive spindles are available from any tractor parts retailer. In one embodiment, the engagement means 45 is fabricated from a PTO drive spline or spindle wherein the post 48 is a portion of the spindle machined to a predetermined diameter.

Figure 2A:
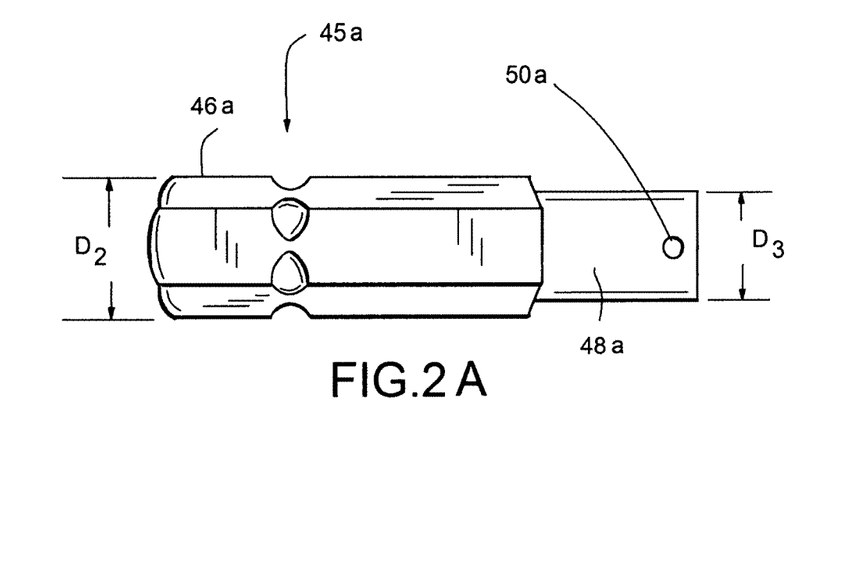
FIG. 2A is a side view of another embodiment of a PTO drive shaft yoke engaging means illustrated as hexagonal bar stock having one end being adapted for rotationally engaging the hitch and an opposing end useful for engaging the PTO drive shaft yoke.

Referring to FIG. 2A another embodiment of the means for rotationally attaching a splined PTO drive shaft yoke to the hitch is presented. In this aspect, the means for engaging the PTO yoke is a hexagonal bar stock having a predetermined length comprising: a shaft 46a having a diameter D2 that is greater than diameter D1 and is adapted to receive the PTO drive shaft splined yoke; and a post 48a on one end of the shaft 46a.

Continuing reference to FIGS. 2 and 2A, the post 48/48a, respectively, has a length that is greater than the thickness of the second member 30 and a diameter D3 that is less than D1. The post 48/48a can either be rigidly affixed separately to the shaft 46/46a or desirably, is a separate portion fabricated of a one-piece engagement means 45/45a using techniques known to those skilled in the fabrication art.

The post 48/48a has a fourth channel 50/50a positioned at a predetermined distance that is greater than the predetermined thickness of the second member 30. The predetermined distance being measured as the distance at the juncture of the shaft 46/46a and the post 48/48a to the fourth channel 50/50a. This allows a retaining means, such as a cotter pin, split pin, clevis pin, bolt, rivet, "C" clip and the like to be inserted into the fourth channel 48 to rotationally secure the engaging means 45/45a on the second member 30.

Figure 3:
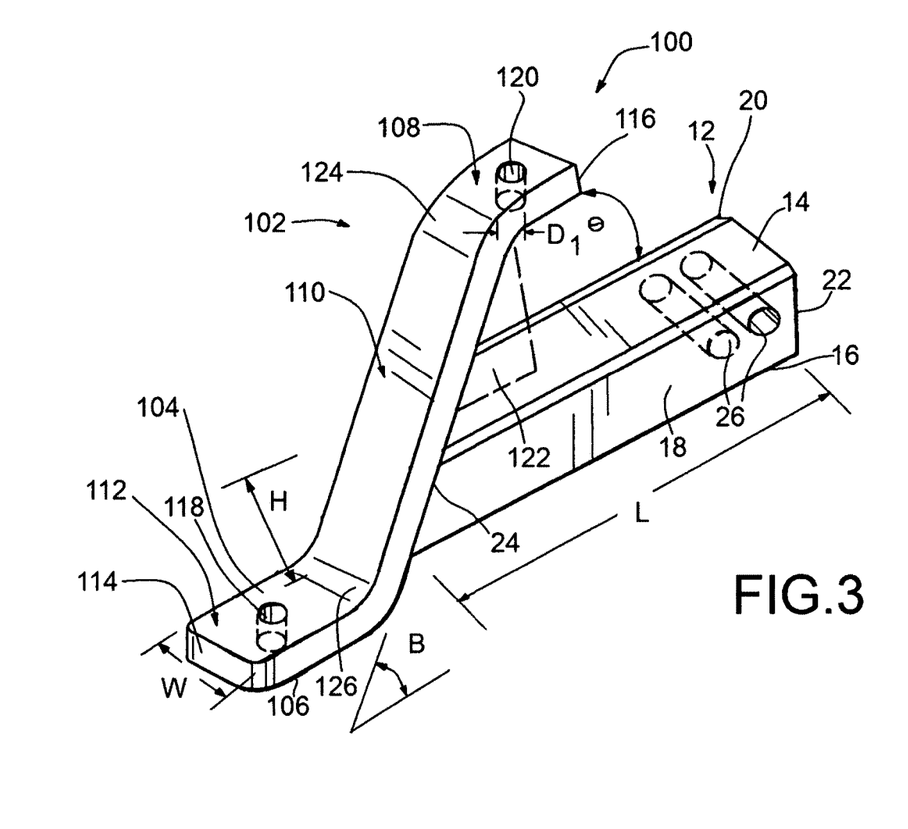
FIG. 3 is a perspective view of another embodiment of the novel hitch of the present invention.

Referring now to FIG. 3, another embodiment of the present invention is illustrated. In this embodiment, the hitch 100 comprises a first member 12 similar to that described above, the description being incorporated herein by reference, with the notable exclusion of the second channel 28. Accordingly, the first member 12 of hitch 100 includes a first top surface 14, an opposing first bottom surface 16, a first side 18, and an opposing second side 20. The first member 12 has a length, "L", as determined by the distance from a first end 22 to a distal second end 24 of from about 4 to about 24 inches, or in another aspect of from 4 to 20 inches, or in yet another aspect of the invention of from about 6 to 16 inches. Proximate to the first end 22 is at least one channel 26 that extends from the first side 18 through to the opposing second side 20. The at least one channel 26 is sized so that a hitch retaining pin can be used to engage with a hitch receiver recess and secure the hitch 100 in the receiver when the hitch 100 is properly positioned and the holes in the receiver recess and at least one channel 26 are in alignment. Such method of securing a hitch in a receiver is typical and well known.

Continuing reference to FIG. 3, the novel hitch 100 further includes a third member 102 rigidly affixed to the distal second end 24 of the first member 12. The third member 102 has a predetermined thickness defined by a third top surface 104 and a third bottom surface 106 and a width "W" of from about 2 to 4 inches. The third member 102 has a non-linear configuration, and preferably is a modified "S" configuration wherein the bends delineate a top section 108, a middle section 110 and a bottom section 112 positioned between a fifth end 114 and a sixth end 116.

The third member 102 includes a first aperture 118 located on the bottom section 112 and is positioned proximate the fifth end 114, i.e., of from about 1 to 3 inches from the fifth end 114. The first aperture 118 extends from the third top surface 104 through to the opposing third bottom surface 106. The first aperture 118 is configured to accept a hitch ball or a hitch pin. The first aperture 118 may be threaded for accepting a ball mount having a threaded bottom portion or may sized so that the threaded portion would pass through the first aperture unimpeded, in which case a separate fastener, such as a lock washer and nut, are utilized to secure the ball to the hitch 100. Such methods for securing a towing ball to a hitch are well known in the art.

The top section 108 includes a second aperture 120 having a predetermined diameter D1 and is positioned proximate to the sixth end 116, i.e., of from about 1 to 3 inches from the sixth end 116. The top section 108 projects above the first top surface 14 a predetermined distance of from about 2 to about 10 inches, or in another aspect of from about 2 to about 8 inches, or yet another aspect of the invention of from about 2 to about 4 inches. The top section 108 is at a first acute angle Ø, as defined by the angle between a plane of the third bottom surface 106 of the top section 108 and a plane of first top surface 14. The first acute angle Ø is from 10 degrees to about 80 degrees, or in another aspect of from 20 to about 65 degrees, or in yet another aspect of the invention from 25 to about 45 degrees.

Continuing reference to FIG. 3, a portion of the middle section 110 is rigidly affixed to at least a portion of the distal second end 24. In one aspect of the invention, the distal second end 24 is affixed to the third member 102 at a point that is substantially in the middle of the middle section 110. In another aspect of the invention, the third member 102 is affixed to the distal second end 24 at a second acute angle ß, defined as the angle formed from the third bottom surface 106 in the middle section 112 and the first bottom surface 16. The second acute angle ß can range from about 15 to 90 degrees, or from about 20 to 90 degrees, or from about 25 to 90 degrees, or from about 35 to 90 degrees. Methods for rigidly affixing the third member 102 to the first member 12 include, but are not limited to, bolting and welding.

The bottom section 112 of the hitch 100 can have a drop "H", defined as the distance extending from a plane parallel to the first top surface 14 to the third top surface 104, of from about 2 inches to about 12 inches, or from about 2 to about 10 inches, or from about 2 to about 6. In one aspect of the invention, the drop H is from about 2 to about 4 inches. Depending upon the height of the drop H and/or the height of the first section 108 from the first member 12, the hitch 100 may optionally, include a support or reinforcing gusset 122, (shown in phantom). The reinforcing gusset 122 may be fabricated from any material that can be rigidly affixed to the first member 12 and the third member 102. In one aspect, the reinforcing gusset 122 is fabricated from A-36 HRS or 1018 CRS and welded to the third bottom surface 106 of the top section 110 and the first top surface 14 of the first member 12. Alternatively, if the drop height H is greater than about 3 inches a lower reinforcing gusset (not shown) may be welded to the first bottom surface 16 and the third bottom surface 106 of the middle section 110. This lower gusset is common in the art for hitches having drops of 6 inches or more.

The third member 102 may be fabricated from any material that is suitable or compatible for rigidly affixing the third member 102 to the first member 12. In the case where the third member 102 is welded to the first member 12 any material may be used that would allow the two materials to be successfully welded, such as for example, 70,000 lb. tensile strength welding wire. In one aspect of the invention, the third member 102 is fabricated from A-36 HRS having a thickness of from 0.250 of an inch to about 1.000 inch. The first and second apertures 118 and 120, respectively, are then drilled to predetermined diameters. The third member 102 is then bent using the appropriate force so that the top section has a length, as defined as the distance from a first bend 124 to the sixth end 116, of from about 1 to about 10 inches, or from about 2 to about 8 inches, or from about 3 to about 6 inches; the middle section has a length, as defined as the distance between the first bend 124 to a second bend 126, of from about 3 inches to about 16 inches, or from about 4 inches to about 12 inches or from about 4 to about 10 inches; and the bottom section 112 has a length, as defined as the distance from the second bend 126 to the fifth end 114, of from about 2 to about 6 inches, or from about 2 to about 4 inches.

The second aperture 120 is adapted to engage a means 45/45a as described above, for rotationally attaching a splined PTO drive shaft yoke to the hitch, the description of which is incorporated herein by reference. In this embodiment, the post 48/48A has a length that is greater than the thickness of the third member 102 and a diameter D3 that is less than D1.

The present invention is illustrated in greater detail by the specific example presented below. It is to be understood that the example is illustrative and is not intended to be limiting of the invention, but rather are to be construed broadly within the scope and content of the appended claims.

EXAMPLE

A hay tedder having a PTO drive shaft was used for fluffing mown hay and to prepare the hay for collecting into bales. The hay rake had a total width of about twenty-eight (28) feet having a center portion of about eight (8) feet and flanking left and right side portions of about nine (9) feet each. Such hay tedders are known in the art of agriculture. The hay tedder was prepared for transport by having the two side portions folded upward toward the center portion and the PTO drive shaft was disconnected from the tractor. Utilizing the hitch of the present invention, the hay tedder was attached to the hitch using a hitch pin. The PTO drive shaft remained connected to the hay tedder and the forward end was connected to the hitch utilizing a tractor drive spline modified as described above. The hay rake was transported without incident, retaining the PTO drive shaft in a supported orientation throughout the distance.

Having described the invention in detail, those skilled in the art will appreciate that modifications may be made to the various aspects of the invention without departing from the scope and spirit of the invention disclosed and described herein. It is, therefore, not intended that the scope of the invention be limited to the specific embodiments illustrated and described but rather it is intended that the scope of the present invention be determined by the appended claims and their equivalents. Moreover, all patents, patent applications, publications, and literature references presented herein are incorporated by reference in their entirety for any disclosure pertinent to the practice of this invention.

We claim:

1. A vehicular hitch comprising:
   a. a first member comprising a first top surface, an opposing first bottom surface, a first side, an opposing second side, a first end, a distal second end, and at least one channel proximate the first end and extending from said first side through said second side and adapted to engage with a hitch retaining pin, and a second channel proximate to said second end and extending from said first top surface through said first bottom surface and configured to accept a hitch ball or hitch pin;
   b. a second member having a predetermined thickness defined by a second top surface and a second bottom surface, said second member further including a third end, a fourth end, and a third channel proximate to said fourth end and having a predetermined diameter D1, said third channel extending through said predetermined thickness, wherein a portion of said second member is rigidly affixed to at least a portion of said first member, and wherein the second bottom surface and said first top surface are at a first acute angle Ø; and
   c. a means for engaging a PTO drive shaft yoke, wherein said engaging means is rotationally affixed to said second member through said third channel.

2. The hitch of claim 1 wherein said third end is affixed to said first member proximate to said distal second end.

3. The hitch of claim 1 wherein said first member has a length of from 4 inches to 24 inches.

4. The vehicular hitch of claim 1 wherein said first member has a length of from 4 inches to 20 inches.

5. The vehicular hitch of claim 1 wherein said first member has a length of from 6 inches to 16 inches.

6. The hitch of claim 1 wherein the engaging means comprises a shaft having a diameter D2 greater than diameter D1; and
   a post affixed to said shaft, said post having a diameter D3 less than D1, said post having a fourth channel positioned on said post at a predetermined distance that is greater than said predetermined thickness of said second member.

7. The hitch of claim 6 wherein said shaft is selected from the group consisting of a modified tractor drive spline and a modified hexagonal bar stock.

8. The vehicular hitch of claim 7 wherein said shaft has a length of from 3 to 9 inches.

9. The vehicular hitch of claim 6 further comprising a retaining member adapted to engage said post through said fourth channel.

10. The vehicular hitch of claim 9 wherein said retaining member is selected from the group consisting of a split pin, a cotter pin, a clevis pin, a bolt, and a rivet.

11. The vehicular hitch of claim 1 wherein said acute angle Ø is from 10 degrees to 80 degrees.

12. The vehicular hitch of claim 1 wherein said acute angle Ø is from 20 degrees to 65 degrees.

13. The vehicular hitch of claim 1 wherein said acute angle Ø is from 25 degrees to 45 degrees.

14. A vehicular hitch comprising:
   a. a first member comprising a first top surface, an opposing first bottom surface, a first side, an opposing second side, a first end, a distal second end, and at least one channel proximate first end and extending from said first side through said second side;
   b. a third member rigidly affixed to said distal second end, said third member having a predetermined thickness defined by a third top surface and a third bottom surface, said third member having a top section, a middle section and a bottom section defined between a fifth end and a sixth end, said third member having a first aperture positioned proximate said fifth end and a second aperture having a predetermined diameter D1 proximate said sixth end, wherein the third bottom surface of the top section and said first top surface are at a first acute angle Ø; and c. a means for engaging a PTO drive shaft yoke, wherein said engaging means is rotationally affixed to said third member through said second aperture.

15. The vehicular hitch of claim 14 wherein said first member has a length of from 6 inches to 16 inches.

16. The vehicular hitch of claim 14 wherein said first aperture has a predetermined diameter for receiving a means to pivotally secure the equipment to the hitch.

17. The vehicular hitch of claim 14 wherein said bottom section has a drop height, H, of from 2 to 12 inches.

18. The vehicular hitch of claim 17 wherein said bottom section has a drop height, H, of from 2 to 4 inches.

19. The vehicular hitch of claim 14 wherein said middle section is affixed to said second end at a second acute angle ß, as determined by the angle formed from the third bottom surface in the middle section and the first bottom surface of the first member, of from 25 to 90 degrees.

20. The vehicular hitch of claim 19 wherein the second acute angle ß of from 35 to 90 degrees.

21. The vehicular hitch of claim 19 wherein the first acute angle Ø is from 25 degrees to 65 degrees.

22. The vehicular hitch of claim 14 further comprising a reinforcing gusset affixed to at least one surface of said first member and at least one surface of said third member.

23. The hitch of claim 14 wherein said engaging means includes a shaft having a diameter D2 greater than diameter D1; and a post affixed to said shaft, said post having a diameter D3 less than D1, said post having a fourth channel positioned on said post at a predetermined distance that is greater than said predetermined thickness of said third member.

24. The hitch of claim 23 wherein said shaft is selected from the group consisting of a modified tractor drive spline and a modified hexagonal bar stock.

25. The vehicular hitch of claim 23 further comprising a retaining member adapted to engage said post through said fourth channel, said retaining member selected from the group consisting of a split pin, a cotter pin, a clevis pin, a bolt, and a rivet.

26. A vehicular hitch comprising:

a. a first member comprising a first top surface, an opposing first bottom surface, a first side, an opposing second side, a first end, a distal second end, and at least one channel proximate first end and extending from said first side through said second side;

b. a third member affixed to said distal second end, said third member having a predetermined thickness defined by a third top surface and a third bottom surface, said third member having a top section, a middle section and a bottom section defined between a fifth end a sixth end, said third member having a first aperture positioned proximate said fifth end and a second aperture having a predetermined diameter D1 proximate said sixth end, wherein the third bottom surface of the top section and said first top surface are at a first acute angle Ø; and c. an engaging means comprising a shaft having a diameter D2 greater than diameter D1; and a post affixed to said shaft, said post having a diameter D3 less than D1, said post having a fourth channel positioned on said post at a predetermined distance that is greater than said predetermined thickness of said third member, wherein said engaging means rotationally engages said third member by inserting said post through said second aperture.

27. The hitch of claim 26 wherein said shaft is selected from the group consisting of a modified tractor drive spline and a modified hexagonal bar stock.

28. The vehicular hitch of claim 26 further comprising a retaining member adapted to engage said post through said fourth channel, said retaining member selected from the group consisting of a split pin, a cotter pin, a clevis pin, a bolt, and a rivet.

* * * * *